(12) United States Patent
Duck et al.

(10) Patent No.: US 12,485,193 B2
(45) Date of Patent: Dec. 2, 2025

(54) ULTRAVIOLET LIGHT EMITTER

(71) Applicant: Watersprint AB, Burnaby (CA)

(72) Inventors: Graham Ian Duck, Vancouver (CA); Babak Adeli Koudehi, Vancouver (CA); Ashkan Babaie, Vancouver (CA)

(73) Assignee: Watersprint AB, Burnaby (CA)

( * ) Notice: Subject to any disclaimer, the term of this patent is extended or adjusted under 35 U.S.C. 154(b) by 969 days.

(21) Appl. No.: 17/668,273

(22) Filed: Feb. 9, 2022

(65) Prior Publication Data

US 2022/0211890 A1 Jul. 7, 2022

Related U.S. Application Data

(63) Continuation of application No. PCT/CA2020/051112, filed on Aug. 13, 2020.

(60) Provisional application No. 62/890,008, filed on Aug. 21, 2019.

(51) Int. Cl.
*A61L 2/10* (2006.01)
*C02F 1/32* (2023.01)

(52) U.S. Cl.
CPC ............... *A61L 2/10* (2013.01); *C02F 1/325* (2013.01); *C02F 2201/3222* (2013.01); *C02F 2201/3228* (2013.01); *C02F 2303/04* (2013.01)

(58) Field of Classification Search
CPC .... A61L 2/10; C02F 1/325; C02F 2201/3222; C02F 2201/3228; C02F 2303/04
See application file for complete search history.

(56) References Cited

U.S. PATENT DOCUMENTS

| | | | |
|---|---|---|---|
| 5,874,741 A | 2/1999 | Matschke |
| 6,303,086 B1 | 10/2001 | Heimer |
| 6,323,301 B1 | 11/2001 | Smith et al. |
| 6,332,688 B1 | 12/2001 | Magarill |
| 6,356,700 B1 | 3/2002 | Strobl |
| 6,454,937 B1 | 9/2002 | Horton et al. |
| 6,646,813 B2 | 11/2003 | Falicoff et al. |
| 6,672,740 B1 | 1/2004 | Li |
| 6,924,943 B2 | 8/2005 | Minano et al. |
| 7,002,140 B2 | 2/2006 | Elsegood et al. |
| 7,055,990 B2 | 6/2006 | Geller et al. |
| 7,161,567 B2 | 1/2007 | Homma et al. |
| 7,172,319 B2 | 2/2007 | Holder et al. |
| 7,481,544 B2 | 1/2009 | McGuire, Jr. |
| 7,641,365 B2 | 1/2010 | Katzir et al. |

(Continued)

FOREIGN PATENT DOCUMENTS

| | | |
|---|---|---|
| CA | 2414544 C | 4/2005 |
| CA | 3011888 A1 | 7/2017 |

(Continued)

*Primary Examiner* — Sean M Luck
(74) *Attorney, Agent, or Firm* — Todd A. Rattray; Oyen Wiggs Green & Mutala LLP (57) ABSTRACT

A light emitting assembly comprises an ultraviolet (UV) light emitting diode (LED) coupled to a UV reflector. The reflector has a three-dimensional shape spanning an angular range between 0° and 180° about a principal reflector axis of the reflector. The reflector is smooth and continuous across its entire surface. The UV-LED is directed towards a reflective surface of the reflector instead of towards the fluid to be treated. A central ray of the UV-LED impinges directly on the reflective surface of the reflector.

20 Claims, 10 Drawing Sheets

(56) References Cited

U.S. PATENT DOCUMENTS

| | | |
|---|---|---|
| 7,741,557 B2 | 6/2010 | Cobb et al. |
| 8,485,692 B2 | 7/2013 | Li |
| 8,686,644 B2 | 4/2014 | Wootton |
| 8,869,419 B2 | 10/2014 | Karlicek, Jr. et al. |
| 8,921,813 B2 | 12/2014 | Palmer et al. |
| 9,346,687 B1 | 5/2016 | Matthews et al. |
| 9,557,034 B2 | 1/2017 | Woodgate et al. |
| 9,632,035 B2 | 4/2017 | Brukilacchio |
| 9,938,165 B2 | 4/2018 | Taghipour |
| 10,062,817 B1 | 8/2018 | Sudradjat et al. |
| 10,105,460 B1 | 10/2018 | Collins et al. |
| 10,517,974 B2 | 12/2019 | Dobrinsky et al. |
| 2010/0260945 A1 | 10/2010 | Kites et al. |
| 2015/0076368 A1 | 3/2015 | Sargent et al. |
| 2015/0314024 A1 | 11/2015 | Khan et al. |
| 2016/0223158 A1 | 8/2016 | Park et al. |
| 2018/0134584 A1 | 5/2018 | Kolch et al. |
| 2018/0170768 A1* | 6/2018 | Cho ..................... C02F 1/441 |

FOREIGN PATENT DOCUMENTS

| | | |
|---|---|---|
| EP | 0561388 B1 | 6/1998 |
| EP | 2767754 A2 | 8/2014 |
| EP | 2050135 B1 | 2/2015 |
| KR | 101650472 B1 | 9/2016 |
| KR | 101874067 B1 | 8/2018 |
| WO | 2008018986 A2 | 2/2008 |
| WO | 2008065418 A1 | 6/2008 |
| WO | 2018048654 A1 | 3/2018 |
| WO | 2018213936 A1 | 11/2018 |
| WO | 2019014770 A1 | 1/2019 |

* cited by examiner

ULTRAVIOLET LIGHT EMITTER

REFERENCE TO RELATED APPLICATIONS

This application is a continuation of Patent Cooperation Treaty (PCT) application No. PCT/CA2020/051112 having an international filing date of 13 Aug. 2020, which in turn claims the benefit of priority from, and for the purposes of the United States of America the benefit under 35 USC 119 in relation to, U.S. application No. 62/890,008 filed 21 Aug. 2019. All of the applications referred to in this paragraph are hereby incorporated herein by reference.

TECHNICAL FIELD

This invention relates to ultraviolet (UV) light emitters. Such emitters have applications in, for example, water and air purification. Particular embodiments provide methods and apparatus for emitting desirable UV radiation patterns.

BACKGROUND

Ultraviolet (UV) light is commonly used for disinfection applications, such as purification or otherwise disinfecting water and/or air. Relatively recently, ultraviolet light emitting diodes (UV-LEDs) have emerged as a desirable source of UV light for such applications.

It is known to use a reflector "cup" or "cone" disposed around a light source to help concentrate light emitted from the light source to have directional components in a particular direction. Such a direction is typically aligned with an optical axis of the device employing the light source. In the context of disinfection applications, a reflector cup can increase light efficiency by concentrating light toward a fluid to be treated, for example, or by creating radiation patterns that are more desirable (e.g. more collimated) than the radiation pattern emitted without the reflector cup.

UV-LEDs generally have emission patterns that are symmetric about its principal optical axis. State of the art reflector cups are usually designed to be symmetric about an optical axis of the device employing the light source. U.S. Pat. No. 9,789,215 discloses a disinfection system which employs a UV-LED light source and a reflector cup that is symmetric about the principal optical axis of the UV-LED. Aligning a UV-LED's principal optical axis and a reflector cup's axis of symmetry may provide a symmetric overall radiation pattern which may be desirable for some applications.

One issue with state of the art UV-LED reflector cup designs is that some of the radiation emitted by the UV-LED may not impinge on the reflector cup, if the reflector cup does not extend sufficiently far in the direction of the UV-LED's principal optical axis. That is some of the radiation within the emission angle φ of the UV-LED does not impinge on the reflective surface of the reflector cup and, consequently, such radiation is not directionally controlled by the reflector cup and may be wasted. This problem results in optical inefficiency as some light emitted from the UV-LED may be sub-optimally directed for a particular application. This optical inefficiency results in lesser control of the UV-LED's rays, as rays that exit the emitter directly, without impinging on the reflector cup, cannot be controlled. In many applications, it is advantageous to control the direction of as many as possible of the rays (i.e. a greater percentage of the light emitted by the emitter). Large reflector cups, which may increase optical efficiency and control over UV rays emitted, require more reflective material which is costly. Large reflector cups are also large and, in many applications, it is desirable to minimize the size of the light emitter. Thus, with prior art UV-LED and reflector cup emitters, there is a trade-off between optical efficiency and control on one hand and cost and size on the other hand. There remains a general desire to address this trade-off.

There remains a general desire to provide cost effective UV-LED and reflector cup emitters. There remains a general desire for such UV-LED and reflector cup emitters to be of relatively small size. There remains a general desire for such UV-LED and reflector cup emitters to allow maximum flexibility to designers to maximally control the directionality and distribution of the radiation.

The foregoing examples of the related art and limitations related thereto are intended to be illustrative and not exclusive. Other limitations of the related art will become apparent to those skilled in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Aspects of the invention include without limitation:
UV-LED emitting methods and apparatus, which may be used, for example, for delivering UV radiation to a fluid; and
apparatus for reflecting UV-LED radiation to provide desirable UV radiation profiles.

One aspect of the invention provides an ultraviolet (UV) radiation emitting assembly comprising: one or more UV-LED(s) having a principal optical axis that is central to the direction of radiation emission from the one or more UV-LED(s); and a reflector located adjacent to the UV-LED(s) and having a three-dimensional shape defined by rotating a smooth and continuous curve having two end points about a principal reflector axis over a reflector angle A, where the reflector angle A is in a range of 120°-300°, the principal reflector axis intersecting the curve at one of the two end points and at no other points on the curve. The principal optical axis of the UV-LED(s) is directed toward the reflector.

The curve may be a portion of a parabola. The curve may be a portion of an ellipse. The curve may be a portion of a circular arc. The curve may be a straight line. The curve may comprise a first portion that is a portion of a parabola and a second portion that is a portion of an ellipse.

The reflector may comprise material suitable for predominantly specular reflection of UV light (e.g. light having wavelengths in a range of 250-300 nm).

The principal optical axis of each UV-LED may form an angle α with the principal reflector axis, the angle α may be in a range of 45°-135°. The principal optical axis of each UV-LED may form an angle α with the principal reflector axis, the angle α may be in a range of 85°-95°.

The one or more UV-LED(s) may comprise a plurality of UV-LEDs arranged symmetrically about a focal point of the reflector. The plurality of UV-LEDs may be located on the principal reflector axis.

The one or more UV-LED(s) may comprise one UV-LED located on the principal reflector axis at a focal point of the reflector.

Each UV-LED may be located within a circle centered at the principal reflector axis and may have a radius of ⅕ of a distance between the reflector and the principal reflector axis measured at an axial location of the UV-LED. Each UV-LED may be located within a distance of 5 times a dimension of the UV-LED of the focal point of the reflector.

The three-dimensional shape may be shaped to capture radiation emitted from the one or more UV-LED(s) from at least 67% of an effective emission angle φ over which the UV-LED(s) emits radiation. The three-dimensional shape may be shaped to capture radiation emitted from the one or more UV-LED(s) over a emission angle φ greater than φ=50°.

The UV radiation emitting assembly may comprise an optical sensor located adjacent to the reflector for measuring radiation emitted by the radiation emitting assembly.

The reflector may be fabricated at least partially by a thermally conductive material and is shaped for dissipating heat generated by the UV-LED(s).

The UV radiation emitting assembly may be used for a surface disinfection application. The UV radiation emitting assembly may be used for a flowing water disinfection application. The reflector may be shaped to collimate radiation emitted from the UV-LED(s) such that the collimated direction is generally parallel (within a solid angle of 15°) with an average flow direction of the water in the flowing water disinfection application. The UV radiation emitting assembly may be used for a still water disinfection application.

Another aspect of the invention provides an ultraviolet (UV) radiation emitting assembly comprising: one or more UV-LED(s) having a principal optical axis that is central to the direction of radiation emission from the one or more UV-LED(s); and a reflector located adjacent to the UV-LED(s) and having a three-dimensional shape defined by rotating a smooth and continuous curve having two end points about a principal reflector axis over a reflector angle θ, where the reflector angle θ is less than 360°, the principal reflector axis intersecting the curve at one of the two end points and at no other points on the curve. The principal optical axis of the UV-LED(s) is directed toward the reflector. The three-dimensional shape is shaped to capture radiation emitted from the one or more UV-LED(s) from at least 67% of an effective emission angle φ over which the UV-LED(s) emits radiation.

The curve may be a portion of a parabola. The curve may be a portion of an ellipse. The curve may be a portion of a circular arc. The curve may be a straight line. The curve may comprise a first portion that is a portion of a parabola and a second portion that is a portion of an ellipse.

The reflector may comprise material suitable for predominantly specular reflection of UV light (e.g. light having wavelengths in a range of 250-300 nm).

The principal optical axis of each UV-LED may form an angle α with the principal reflector axis, the angle α may be in a range of 45°-135°. The principal optical axis of each UV-LED may form an angle α with the principal reflector axis, the angle α may be in a range of 85°-95°.

The one or more UV-LED(s) may comprise a plurality of UV-LEDs arranged symmetrically about a focal point of the reflector. The plurality of UV-LEDs may be located on the principal reflector axis.

The one or more UV-LED(s) may comprise one UV-LED located on the principal reflector axis at a focal point of the reflector.

Each UV-LED may be located within a circle centered at the principal reflector axis and may have a radius of ⅕ of a distance between the reflector and the principal reflector axis measured at an axial location of the UV-LED. Each UV-LED may be located within a distance of 5 times a dimension of the UV-LED of the focal point of the reflector.

The reflector angle A may be in a range of 120°-300°.

The three-dimensional shape may be shaped to capture radiation emitted from the one or more UV-LED(s) from at least 67% of an effective emission angle φ over which the UV-LED(s) emits radiation. The three-dimensional shape may be shaped to capture radiation emitted from the one or more UV-LED(s) over a emission angle φ greater than φ=50°.

The UV radiation emitting assembly may comprise an optical sensor located adjacent to the reflector for measuring radiation emitted by the radiation emitting assembly.

The reflector may be fabricated at least partially by a thermally conductive material and is shaped for dissipating heat generated by the UV-LED(s).

The UV radiation emitting assembly may be used for a surface disinfection application. The UV radiation emitting assembly may be used for a flowing water disinfection application. The reflector may be shaped to collimate radiation emitted from the UV-LED(s) such that the collimated direction is generally parallel (within a solid angle of 15°) with an average flow direction of the water in the flowing water disinfection application. The UV radiation emitting assembly may be used for a still water disinfection application.

Another aspect of the invention provides an ultraviolet (UV) radiation emitting assembly comprising: one or more UV-LED(s) having a principal optical axis that is central to the direction of radiation emission from the one or more UV-LED(s); and a reflector located adjacent to the UV-LED (s), the reflector having a three-dimensional shape and a principal reflector axis. The three-dimensional shape spans an angular range A in a range of 120°-300° about the principal reflector axis. For each axial cross-section plane that includes the principal reflector axis and intersects the three-dimensional shape, a surface of the three-dimensional shape is defined by a smooth and continuous cross-section curve having a first endpoint and a second endpoint, the first end point intersected by the principal reflector axis. For at least two such axial cross-section planes, the corresponding smooth and continuous cross-section curves are different from one another. The defined three-dimensional shape varies smoothly between the cross-section curves. The principal optical axis of the UV-LED(s) is directed towards the reflector.

The reflector may comprise material suitable for predominantly specular reflection of UV light (e.g. light having wavelengths in a range of 250-300 nm).

The principal optical axis of each UV-LED may form an angle α with the principal reflector axis, the angle α may be in a range of 45°-135°. The principal optical axis of each UV-LED may form an angle α with the principal reflector axis, the angle α may be in a range of 85°-95°.

The one or more UV-LED(s) may comprise a plurality of UV-LEDs arranged symmetrically about a focal point of the reflector. The plurality of UV-LEDs may be located on the principal reflector axis.

The one or more UV-LED(s) may comprise one UV-LED located on the principal reflector axis at a focal point of the reflector.

Each UV-LED may be located within a circle centered at the principal reflector axis and may have a radius of ⅕ of a distance between the reflector and the principal reflector axis measured at an axial location of the UV-LED. Each UV- LED may be located within a distance of 5 times a dimension of the UV-LED of the focal point of the reflector.

The three-dimensional shape may be shaped to capture radiation emitted from the one or more UV-LED(s) from at least 67% of an effective emission angle ϕ over which the UV-LED(s) emits radiation. The three-dimensional shape may be shaped to capture radiation emitted from the one or more UV-LED(s) over a emission angle ϕ greater than ϕ=50°.

The UV radiation emitting assembly may comprise an optical sensor located adjacent to the reflector for measuring radiation emitted by the radiation emitting assembly.

The reflector may be fabricated at least partially by a thermally conductive material and is shaped for dissipating heat generated by the UV-LED(s).

The UV radiation emitting assembly may be used for a surface disinfection application. The UV radiation emitting assembly may be used for a flowing water disinfection application. The reflector may be shaped to collimate radiation emitted from the UV-LED(s) such that the collimated direction is generally parallel (within a solid angle of 15°) with an average flow direction of the water in the flowing water disinfection application. The UV radiation emitting assembly may be used for a still water disinfection application.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used in this disclosure and in the accompanying claims, unless the context dictates otherwise, the term light should include electromagnetic radiation that may be both inside and outside of the human-visible spectrum. As used in this disclosure and in the accompanying claims, unless the context dictates otherwise, the terms ultraviolet light, UV light, ultraviolet radiation and UV radiation should be understood to include electromagnetic radiation that comprises at least some light having a wavelength shorter than that of the visible spectrum but which may also comprise light that is in the human-visible spectrum. In some exemplary and non-limiting embodiments, the UV radiation used has wavelengths in a range of 250 nm-300 nm.

Figure 1:
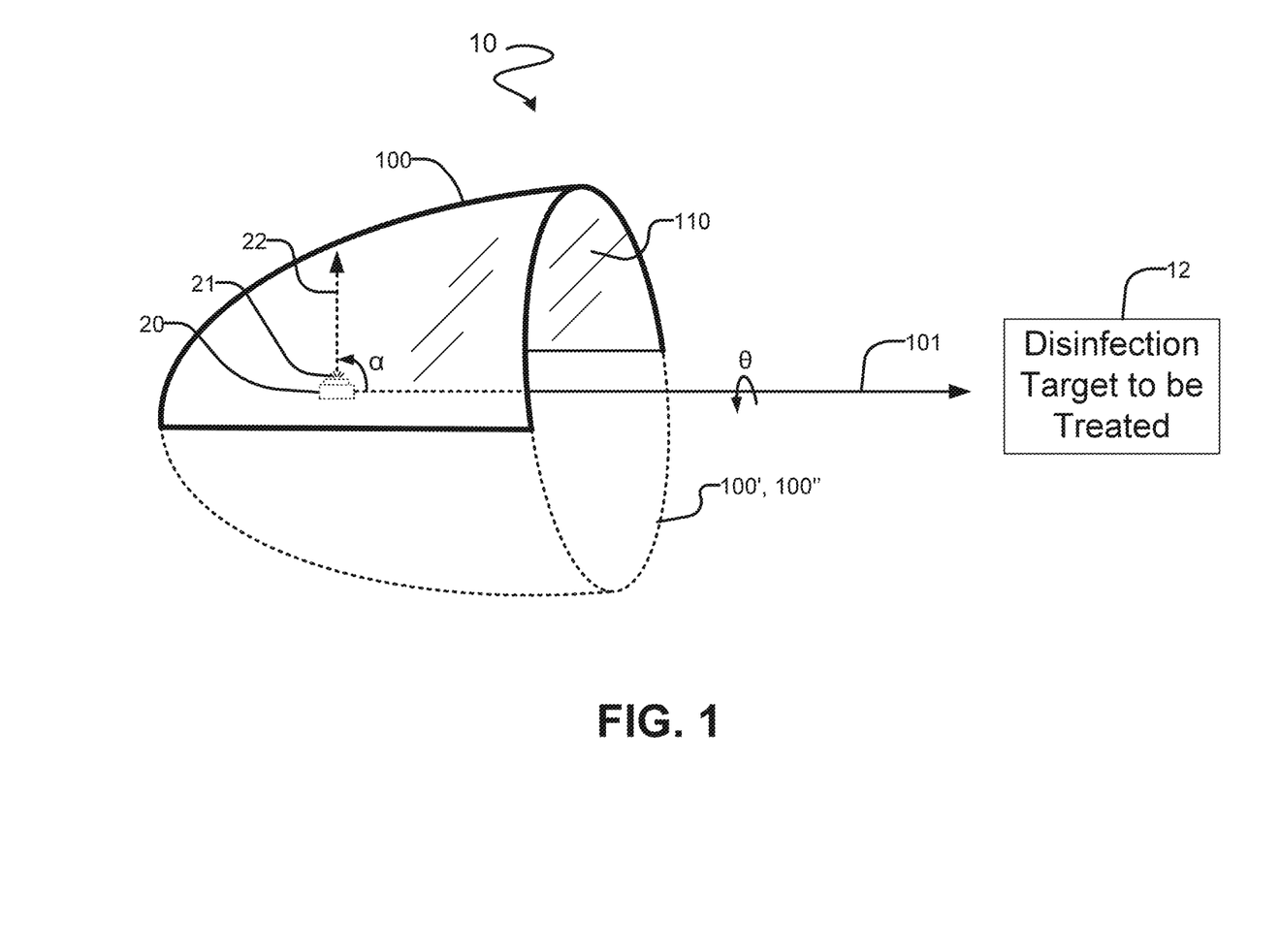
FIG. 1 is a schematic perspective view of a light emitting assembly comprising a UV-LED and a reflector according to an example embodiment of the invention.

FIG. 1 is a perspective view of a light emitting assembly 10 comprising one or more UV-LEDs 20 (a single UV-LED 20 in the case of the illustrated embodiment) coupled to a UV reflector 100 according to an example embodiment of the invention. Reflector 100 comprises a dominantly specular reflective surface 110 made of materials suitable for reflecting UV light 21 (e.g. aluminum and/or the like) emitted by UV-LED 20, in a specular fashion. UV-LED 20 is located adjacent to reflector 100 and is oriented such that its principal optical axis 22 is directed towards reflective surface 110 of reflector 100 instead of towards disinfection target 12 (e.g. fluid). Hence, UV light 21 emitted by UV-LED 20 along principal optical axis 22 impinges on reflective surface 110.

Figure 1A:
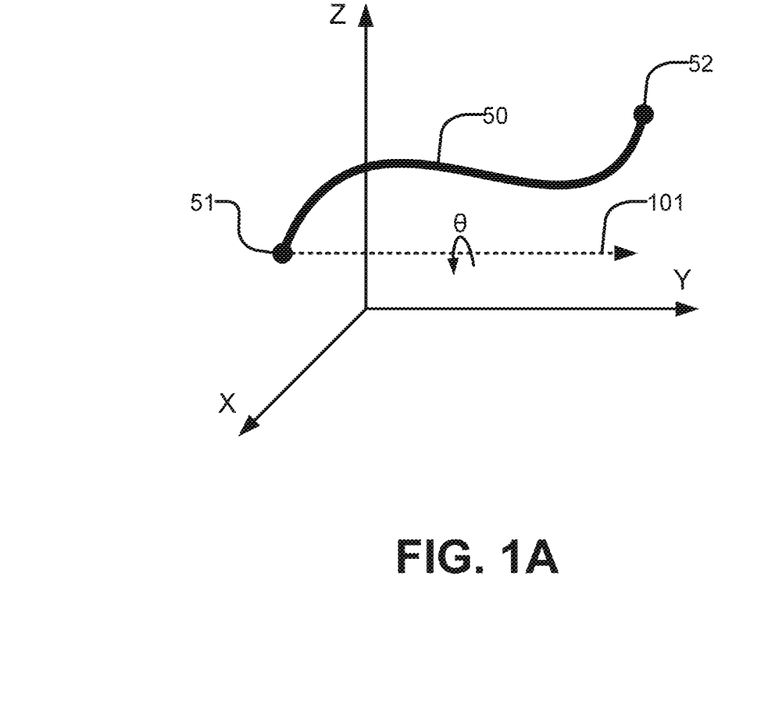
FIG. 1A shows a curve rotatable about an axis to define the shape of a reflector according to an example embodiment of the invention.

FIG. 1A is a schematic illustration showing characteristics of possible example shapes of reflective surface 110 of reflector 100 of the FIG. 1 light emitter assembly 10. For brevity, this disclosure and/or the accompanying claims may refer to the shape of a reflector. Unless the context dictates otherwise, the shape of a reflector should be understood to refer to the shape of the reflective surface of the reflector. Referring simultaneously to FIGS. 1 and 1A, reflector 100 may comprise a three-dimensional shape defined by rotating a smooth and continuous curve 50 having end points 51 and 52 about a principal reflector axis 101 that intersects one of the end points (51 in the case of the illustrated embodiment) over a reflector angle A measured about principal reflector axis 101. In some embodiments, reflector angle A may be in a range between 120°-360°. In some embodiments, this reflector angle A is greater than 120°, but less than 360°. In some embodiments, this reflector angle A may be in a range between 120°-300°. In some embodiments, this reflector angle A may be in a range between 120°-270°. In some embodiments, this reflector angle A may be in a range between 120°-200°. In the specific case of the FIG. 1 illustrated embodiment, principal reflector axis 101 is co-linear with the rotational axis of symmetry of a notional quadratic surface 100', where the notional quadratic surface 100' includes the reflective surface 110 of reflector 100 and spans a full 360° angular range about principal reflector axis 101. In the specific case of the FIG. 1 illustrated embodiment, principal reflector axis 101 is co-linear with the rotational axis of symmetry of a notional paraboloid surface 100", where the notional paraboloid surface 100" includes the reflective surface 110 of reflector 100 and spans a full 360° angular range about principal reflector axis 101. Neither of these properties of the shape of reflector 100 (or its reflective surface 110) are necessary. In some embodiments, the shape of reflector 100 may comprise a three-dimensional shape defined by rotating an arbitrary smooth and continuous curve 50 having end points 51 and 52 about a principal reflector axis 101 that intersects one of the end points (51 in the case of the illustrated embodiment) over a reflector angle A measured about principal reflector axis.

In some embodiments, principal reflector axis 101 intersects curve 50 at only one of end points 51 and 52 (and no other points). In some embodiments, principal reflector axis 101 is aligned to point toward the direction of a disinfection target 12 (e.g. fluid).

In the FIG. 1 example embodiment, reflector 100 has the shape of a "half-paraboloid" formed by sweeping a parabolic curve 50 about principal reflector axis 101 over a 180° reflector angle θ. In other embodiments, reflector 100 may take on other shapes (e.g. a "quarter-ellipsoid", a "half-cone", etc.) depending on the shape of curve 50 and/or the reflector angle θ. Curve 50 may be a parabola, a fraction (e.g. a quarter) of an ellipse, an arc, a line, or any other suitable smooth and continuous function.

Principal optical axis 22 of UV-LED 20 and principal reflector axis 101 intersect to form a polar angle α. In the illustrated embodiment of FIG. 1, principal optical axis 22 is orthogonal to principal reflector axis 101 (i.e. α=90°). This is not necessary. In some embodiments, polar angle α between principal optical axis 22 and principal reflector axis 101 may span an angular range between 45° and 135°.

UV-LED 20 may be optionally located on principal reflector axis 101 or close to principal reflector axis 101 (e.g. within a circle of ⅕ the reflector's spacing from principal reflector axis 101 measured at the axial location of UV-LED 20). By positioning UV-LED 20 on or close to principal reflector axis 101, assembly 10 can advantageously emit symmetric radiation patterns. In some embodiments, UV-LED 20 may be located on (or close to—e.g. within a circle of ⅕ the reflector's spacing from principal reflector axis 101 measured at the axial location of UV-LED 20 from) the focal point of notional quadratic surface 100' or notional paraboloid surface 100". Neither of these characteristics of the location of UV-LED 20 is necessary.

Figure 1B:
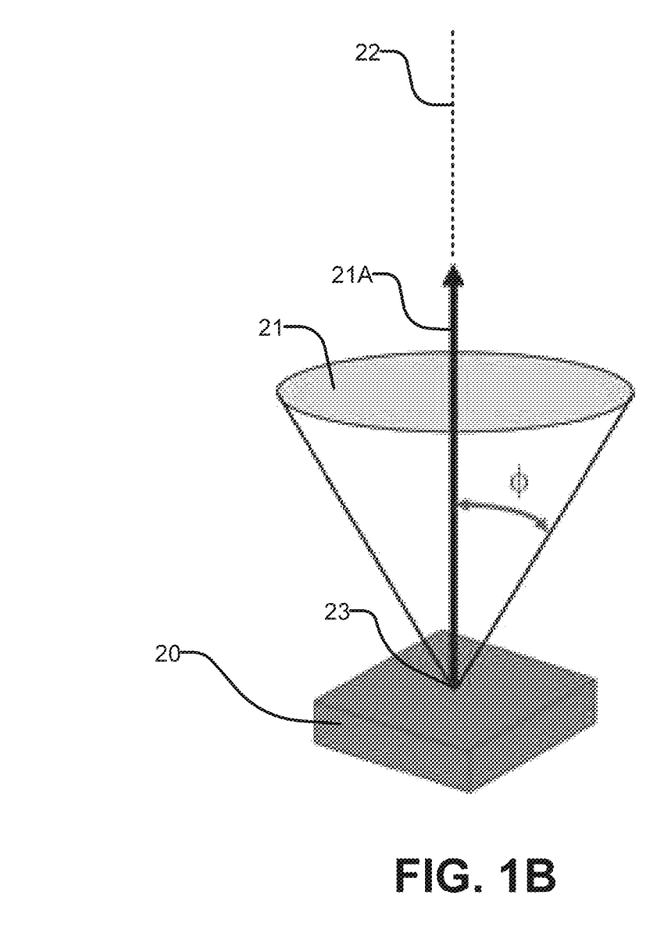
FIG. 1B is a schematic diagram depicting some characteristics of an example radiation pattern emitted by a UV-LED.

FIG. 1B is a schematic diagram depicting some characteristics of an example radiation pattern emitted by an example UV-LED 20. UV-LED 20 emits a central ray 21A from a center 23 of UV-LED 20 along principal optical axis 22. Central ray 21A may be oriented to be generally normal (e.g. ±10°) to the surface of UV-LED 20. UV-LED 20 emits UV light 21 in other directions. The angle between central ray 21A (or principal optical axis 22) and rays of UV light 21 emitted in other directions defines an emission angle φ of UV-LED 20. At locations equidistant from center 23 of UV-LED 20, the intensity of UV light 21 may be generally highest along principal optical axis 22 (i.e. φ=0°) and progressively lower at higher emission angles. In some embodiments, the intensity of UV light 21 emitted by UV-LED 20 at emission angles greater than φ=75° may be negligible or may be considered to be negligible for the purpose of disinfection applications. The emission angle φ greater than which the intensity of UV light 21 emitted by UV-LED 20 is negligible (e.g. less than 2% of the total radiation power) may be referred to as the effective emission angle φ of UV-LED 20.

Figure 2A:
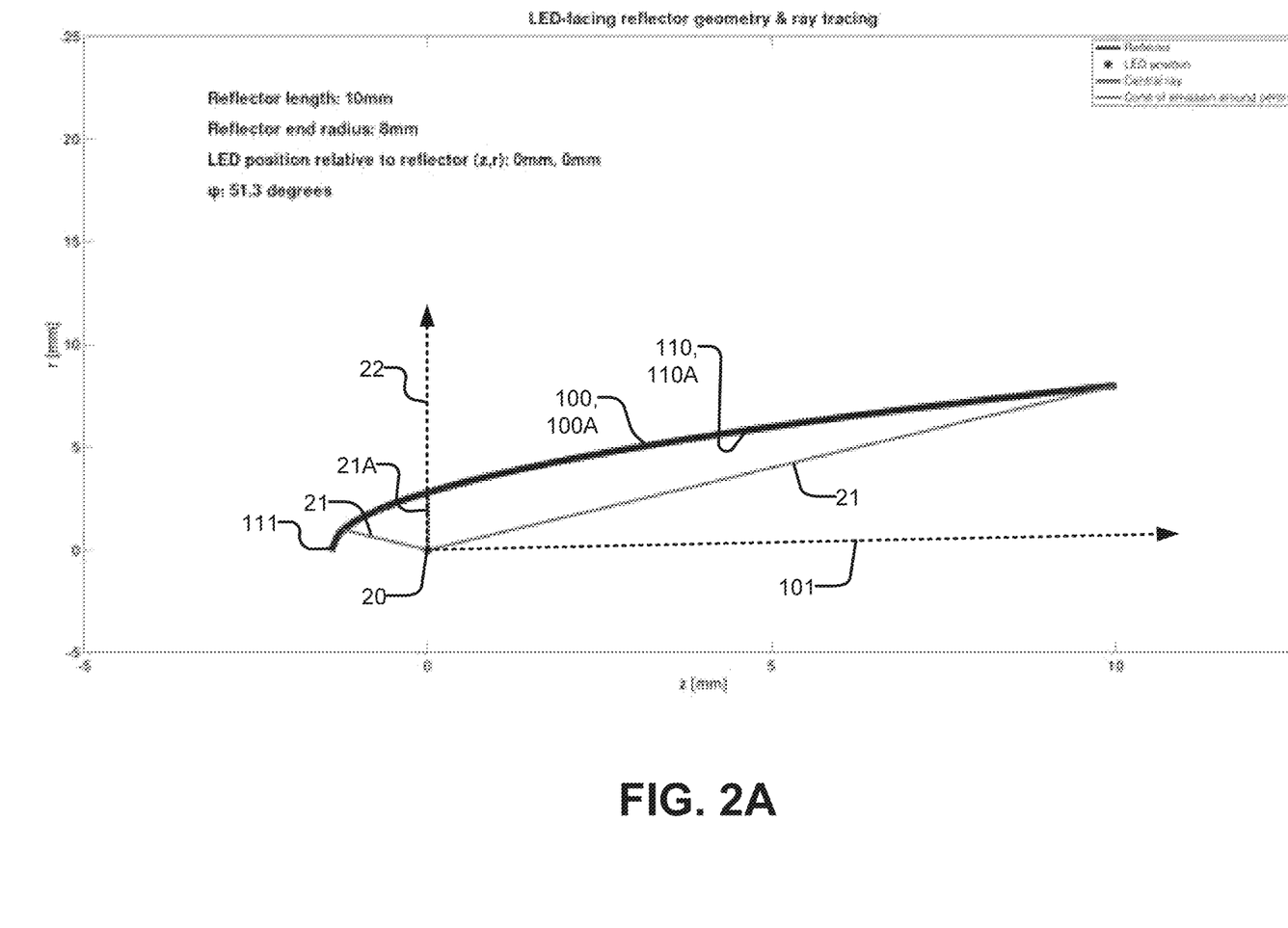
FIGS. 2A and 2B are schematic axial cross-sectional diagrams of example light emitting assemblies comprising a UV-LED and a reflector cone.
Figure 2B:
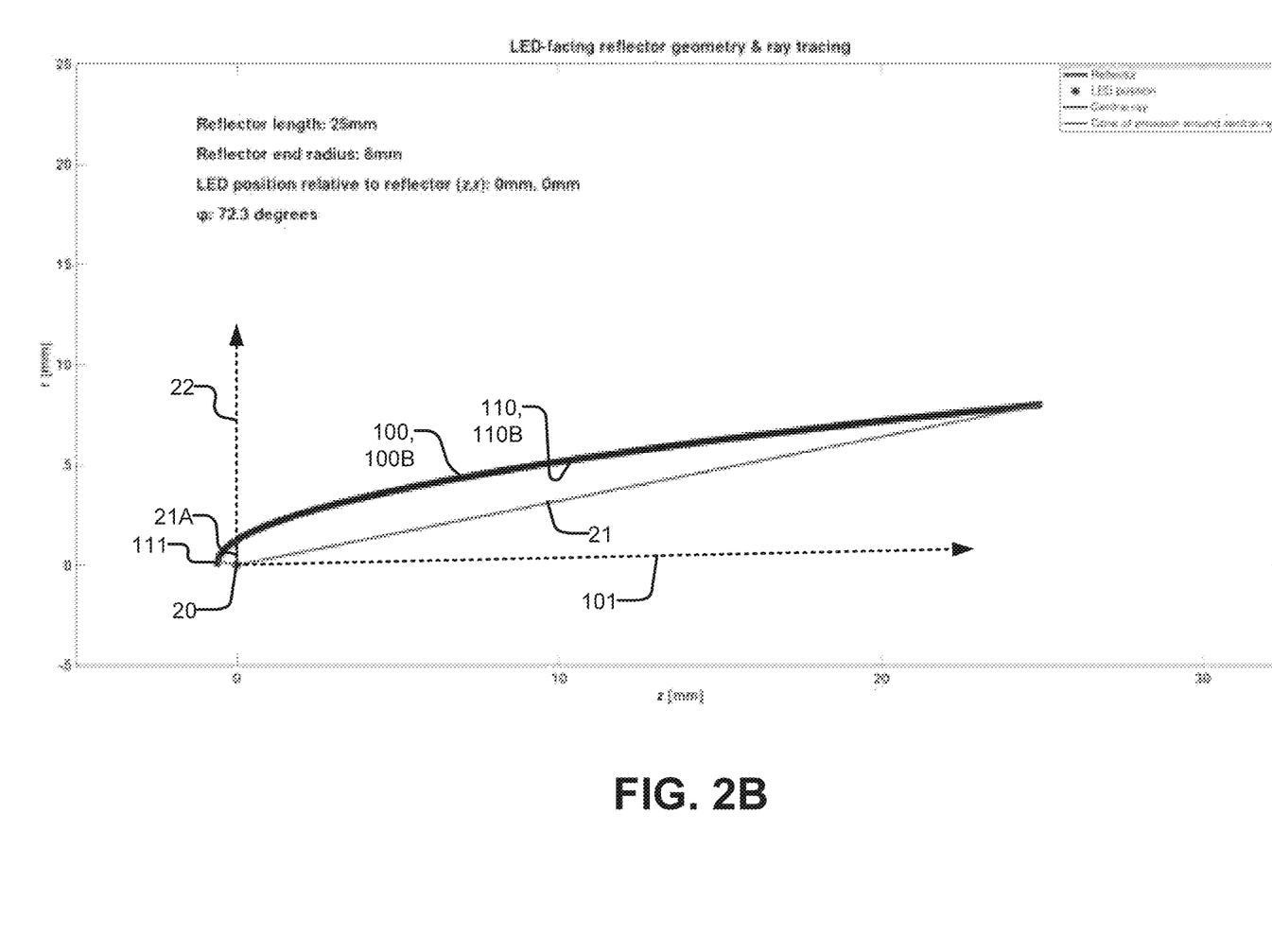

FIGS. 2A and 2B are schematic axial cross-sectional diagrams of UV-LED 20 emitting UV light 21 into a UV reflector 100 according to example embodiments of the invention. In this disclosure and the accompanying claims, unless the context dictates otherwise, an axial cross-section may be considered to be a cross-section in a plane that includes the principal reflector axis 101 of a UV reflector 100. FIGS. 2A and 2B schematically depict axial cross-sections in planes that include a line segment corresponding to the reflective surface 110 of reflector 100 and principal reflector axis 101. In the illustrated embodiments of FIGS. 2A and 2B, the axial cross-sectional line segment of reflective surface 110 of reflector 100 has a parabolic shape. In some embodiments, the axial cross-sectional line segment of reflective surface 110 of reflector 100 may have other smooth and continuous shapes. In the example embodiments of FIGS. 2A and 2B, UV-LED 20 is located on principal reflector axis 101 at a focal point of the shape of the axial cross-sectional line segment of reflective surface 110 of reflector 100 (e.g. at the focal point of a partial parabolic segment). In the example embodiments of FIGS. 2A and 2B, principal optical axis 22 of UV-LED 20 is orthogonal to principal reflector axis 101.

In the FIG. 2A example embodiment, the length of reflector 100A along its principal reflector axis 101 is relatively short (i.e. 10 mm). As a result, only UV light 21 emitted by UV-LED 20 at emission angles smaller than φ=53.1° impinges on reflector 100A.

In the FIG. 2B example embodiment, the length of reflector 100B along its principal reflector axis 101 is two and a half times longer than that of reflector 100A (i.e. 25 mm). As a result, UV light 21 emitted by UV-LED 20 at emission angles up to φ=72.3° impinges on reflector 100B.

In some embodiments, the length of reflector 100 is selected to balance the trade-off between capturing light emitted by UV-LED 20 at higher emission angles (φ) and minimizing size and/or costs associated with providing a larger reflector 100. It will be appreciated that the emission angle of a UV-LED 20 is a property of the LED itself and, consequently, for a given UV-LED 20, capturing light emitted at higher emission angles (φ) may be correlated with allowing optimum directional control of the radiation (e.g. a percentage of light emitted by UV-LED 20 that is usable for a given purpose, such as a disinfection application).

In some embodiments, the shape of reflector 100 (e.g. the length of reflector 100 along its principal reflector axis 101 and/or the reflector angle A measured about principal reflector axis 101) is designed to capture radiation emitted from at least 67% of the effective UV-LED emission angle φ over which UV-LED 20 emits radiation—i.e. 67% or more of the radiation from UV-LED 20 over its effective emission angle φ impinges on reflector 100. In some embodiments, reflector 100 is shaped so that 75% or more of the radiation from UV-LED 20 over its effective emission angle φ impinges on reflector 100. In some embodiments, reflector 100 is shaped so that 85% or more of the radiation from UV-LED 20 over its effective emission angle φ impinges on reflector 100. In some embodiments, reflector 100 is shaped so that 90% or more of the radiation from UV-LED 20 over its effective emission angle φ impinges on reflector 100.

In some embodiments, the shape of reflector 100 (e.g. the length of reflector 100 along its principal reflector axis 101 and/or the reflector angle θ measured about principal reflector axis 101) is designed to capture radiation emitted from a emission angle φ greater than φ=50°. That is, reflector 100 is shaped such that radiation emitted at an emission angle less than φ=50° impinges on reflector 100. In some embodiments, reflector 100 is shaped such that radiation emitted at an emission angle less than φ=60° impinges on reflector 100. In some embodiments, reflector 100 is shaped such that radiation emitted at an emission angle less than φ=70° impinges on reflector 100. In some embodiments, reflector 100 is shaped such that radiation emitted at an emission angle less than φ=75° impinges on reflector 100.

In some embodiments, the polar angle α (see FIG. 1) between principal optical axis 22 of UV-LED 20 and principal reflector axis 101 is selected to balance the above-mentioned trade-off and/or to provide a more desirable UV radiation profile. For example, UV-LED 20 may be oriented towards a base 111 of reflective surface 110 (see FIGS. 2A, 2B) which corresponds to α>90° or away from base 111 of reflective surface 110 which corresponds to α<90°. Titling UV-LED 20 towards base 111 (α>90°) may allow reflector 100 to capture more UV light 21 at higher emission angles (φ) without increasing the length of reflector 100. Titling UV-LED 20 away from base 111 (α<90°) may allow more UV light 21 to impinge directly on disinfection target 12 (without reflecting from reflector 100).

Figure 3:
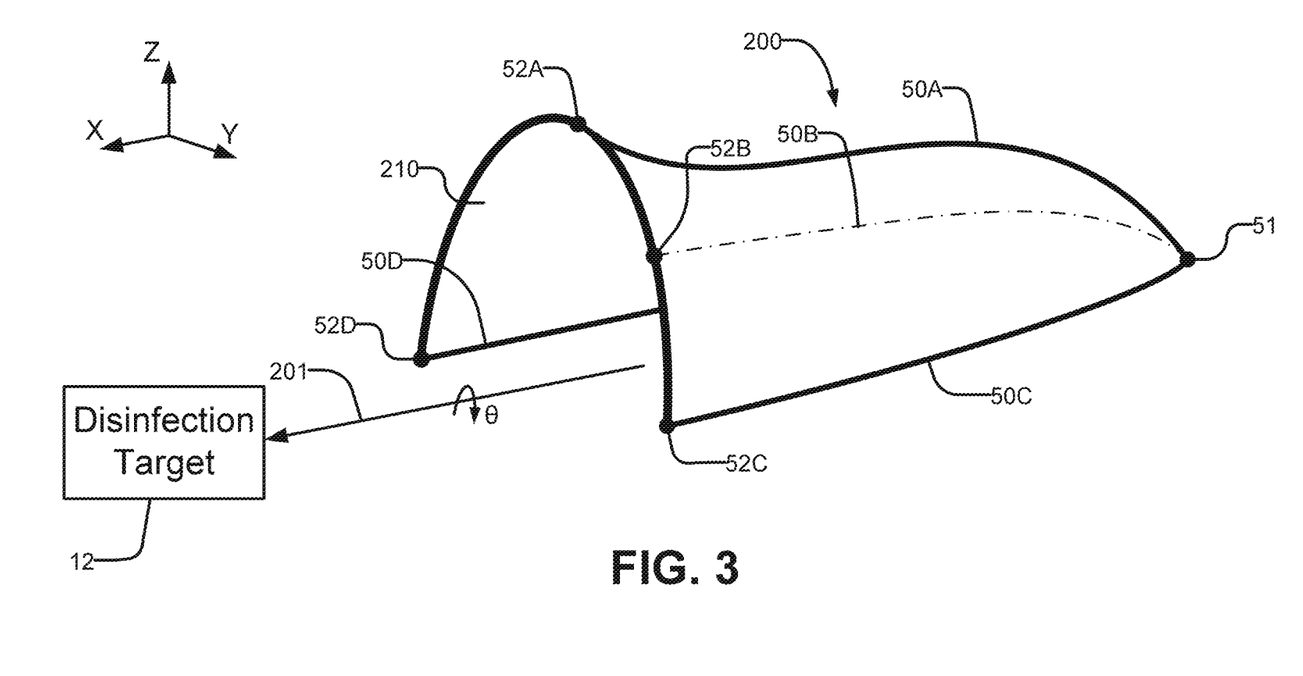
FIG. 3 is a perspective view of a freeform reflector according to an example embodiment of the invention.

FIG. 3 is a perspective view of a freeform UV reflector 200 according to another example embodiment of the invention. Reflector 200 is similar in many respects to reflector 100 and features of reflector 200 that are similar to reflector 100 may be labelled using reference numbers that are similar to those used for reflector 100, except that the reference numerals used for reflector 200 use a first digit 2, whereas the reference numerals used for reflector 100 use a first digit 1. Similarly to reflector 100, reflector 200 comprises a reflective surface 210 made of materials suitable for reflecting UV light 21 emitted by UV-LED 20. UV-LED 20 (not shown) may be located adjacent to reflector 200 and suitably oriented to emit UV light 21 in directions that impinge on reflective surface 210. In some embodiments, the principal optical axis 22 of such a UV-LED 20 may be orthogonal to the principal reflector optical axis 201 (i.e. α=90°), although this is not necessary.

Figure 3A:
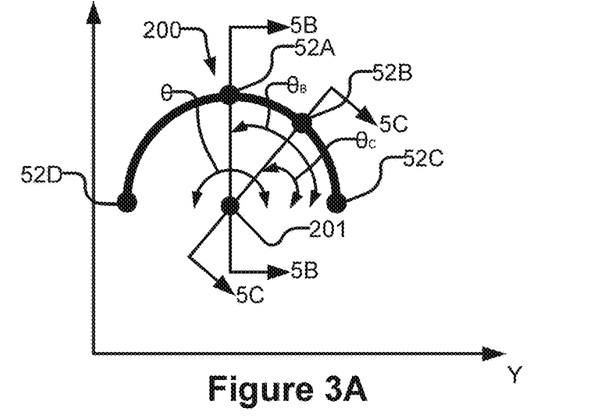
FIG. 3A is a transverse elevation view of the reflector shown in FIG. 3.

Reflector 200 has a smooth and continuous three-dimensional shape defined by smoothly varying surfaces between a plurality of different smooth and continuous curves 50A, 50B, 50C, 50D (collectively, curves 50) having a common first end point 51 and respective second ends points 52A, 52B, 52C, 52D (collectively, end points 52). Curves 50 are angularly spaced apart about a principal reflector axis 201 of reflector 200 and the reflective surface 210 of reflector 200 is shaped such that its three-dimensional shape is smooth and continuous, includes curves 50 and spans an angle A about principal reflector axis 201 of reflector 200 (see FIG. 3A). In some embodiments, the angle A spanned by reflective surface 210 of reflector 200 is in a range between 120°-360°. In some embodiments, this reflector angle A is greater than 120°, but less than 360°. In some embodiments, this reflector angle A may be in a range between 120°-300°. In some embodiments, this reflector angle A may be in a range between 120°-270°. In some embodiments, this reflector angle A may be in a range between 120°-200°. In some embodiments, principal reflector axis 201 may be defined as an axis intersecting the common first end point 51 of all curves 50. In some embodiments, curves 50 may be symmetric with respect to a plane that includes principal reflector axis, although this is not necessary FIG. 3A is a schematic transverse elevation view of reflector 200, where the transverse view shown in FIG. 3A is from a perspective where a normal to the transverse plane is aligned with principal reflector axis 201. In the particular case of the illustrated FIG. 3A embodiment, the curvature of reflector 200 between angularly adjacent second end points 52 of angularly adjacent curves 50 form arcs in the FIG. 3A view, but this is not necessary. In some embodiments, the curvature of reflector 200 between angularly adjacent second end points 52 of angularly adjacent curves 50 form other smooth and continuous shapes as they span the angle A about principal reflector axis 201.

Figure 3B:
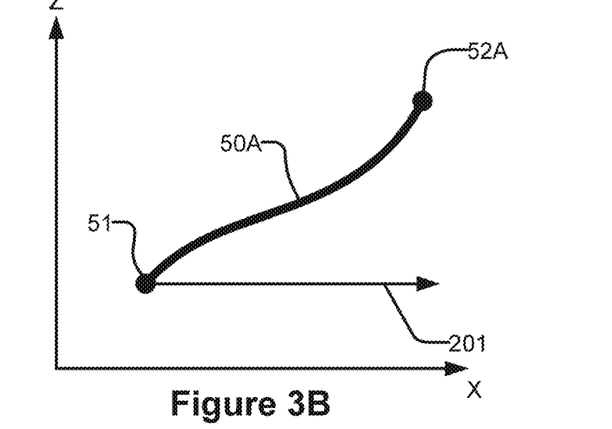
FIGS. 3B and 3C are different axial cross sectional views of the reflector shown in FIG. 3.
Figure 3C:
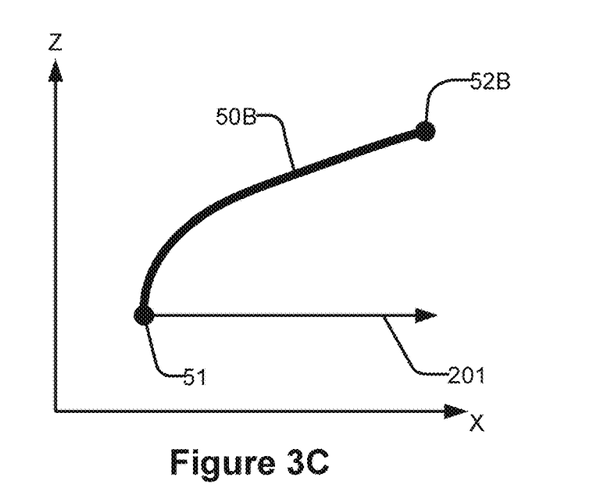

FIGS. 3B and 3C are axial cross sectional planar views of reflector 200. FIGS. 3B and 3C respectively depict axial cross sections of reflector 200 at reflector angles $\theta_B$ and $\theta_C$ which respectively correspond to second end points 52A, 52B. Each axial cross section plane includes principal reflector axis 201 and intersects reflector 200 at various points along its reflective surface. These points form curves 50 having first and second end points 51 and 52 in the FIGS. 3B and 3C views. Curves 50 are smooth and continuous between end points 51 and 52. In some embodiments, curves 50 intersect principal reflector axis 201 only at their common first end points 51 (and no other points).

In the FIG. 3 example embodiment, an axial cross section of reflector 200 at a first reflector angle $\theta_B=90°$ comprises a first curve 50A having first and second end points 51, 52A (see FIG. 3B) while an axial cross section of reflector 200 at a second reflector angle $\theta_C=50°$ comprises a second curve 50B having first and second end points 51, 52B (see FIG. 3C). In some embodiments, reflector 200 is shaped so that axial cross sections at different reflector angles A provide different curves 50. In some embodiments, curves 50 may be unique as between different reflector angles θ. In some embodiments, curves 50 may be mirror symmetric about a plane defined by principal reflector axis 201 and a vector directed towards a specific reflector angle θ'.

In some embodiments, reflector 200 is symmetric about a plane intersecting principal reflector axis 201 and reflector 200 at a reflector angle θ'. Reflectors 200 with such designs may advantageously provide radiation patterns that are more symmetric than reflectors that do not exhibit such symmetry.

Figure 4:
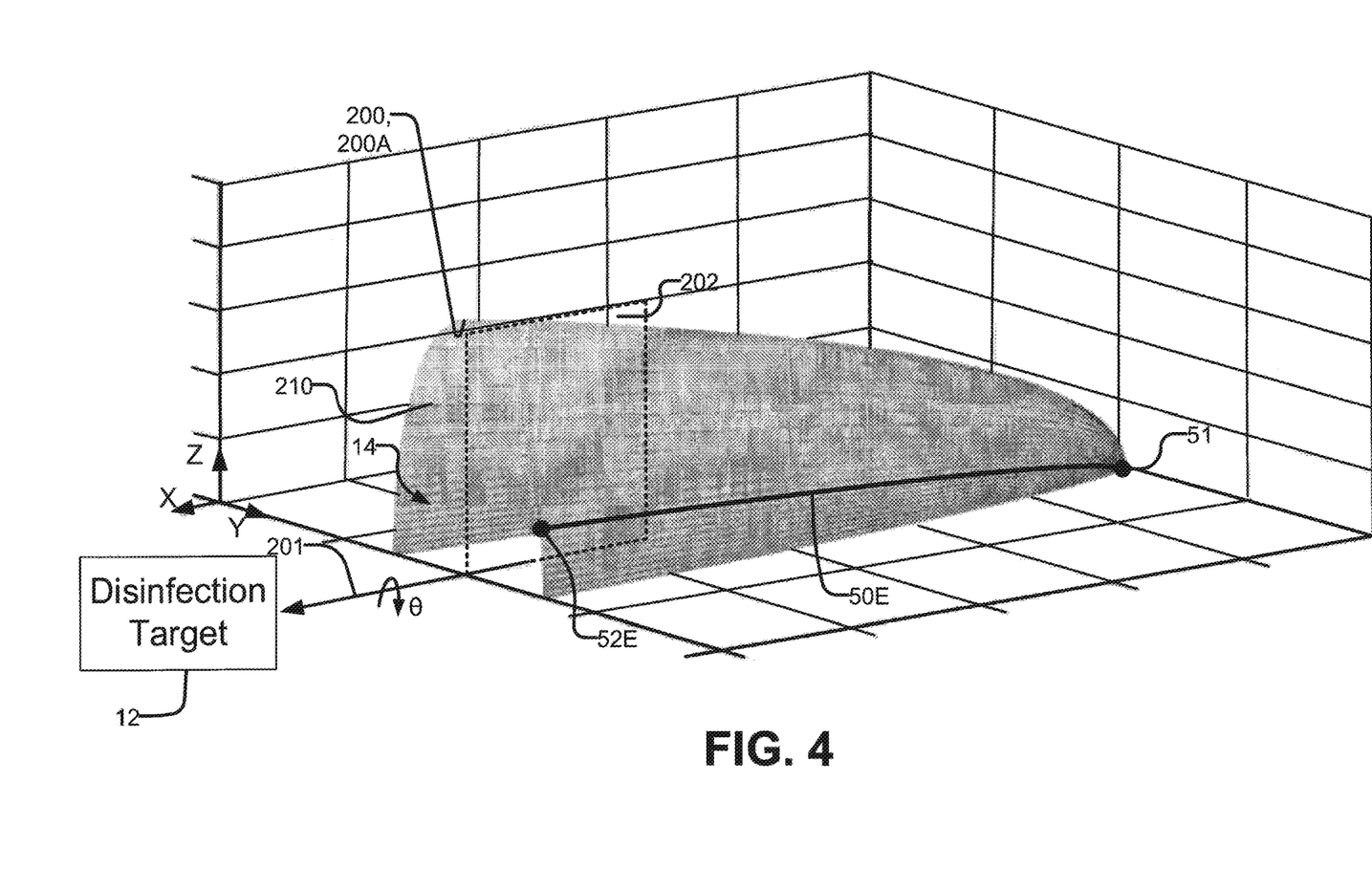
FIG. 4 is a schematic perspective view of a specific example embodiment of the FIG. 3 freeform reflector.

FIG. 4 is a schematic perspective view of a specific example embodiment 200A of the FIG. 3 freeform reflector 200. Freeform reflector 200A is a specific embodiment of the FIG. 3 freeform reflector 200, where each of curves 50 has a parabolic shape to provide a corresponding parabolic curve 50E having end points 51, 52E. Parabolic curves 50E may have different foci at different reflector angles θ. Parabolic curves 50E may optionally share a common vertex at their respective first end points 51.

In the FIG. 4 example embodiment, reflector 200A spans an angular range A about principal reflector axis 201 that is in a range between 120°-360°. In some embodiments, this reflector angle A is greater than 120°, but less than 360°. In some embodiments, this reflector angle A may be in a range between 120°-300°. In some embodiments, this reflector angle A may be in a range between 120° 270°. In some embodiments, this reflector angle A may be in a range between 120°-200°. Reflector 200A is symmetric about a plane of symmetry 202 containing principal reflector axis 201 and curve 50E at reflector angle θ=θ'=90°. Reflector 200A is shaped so that the axial distance between principal reflector axis 201 and reflector 200A is greatest at reflector angle θ=θ'=90°, and progressively smaller at increasingly higher and decreasingly lower reflector angles.

Figure 4A:
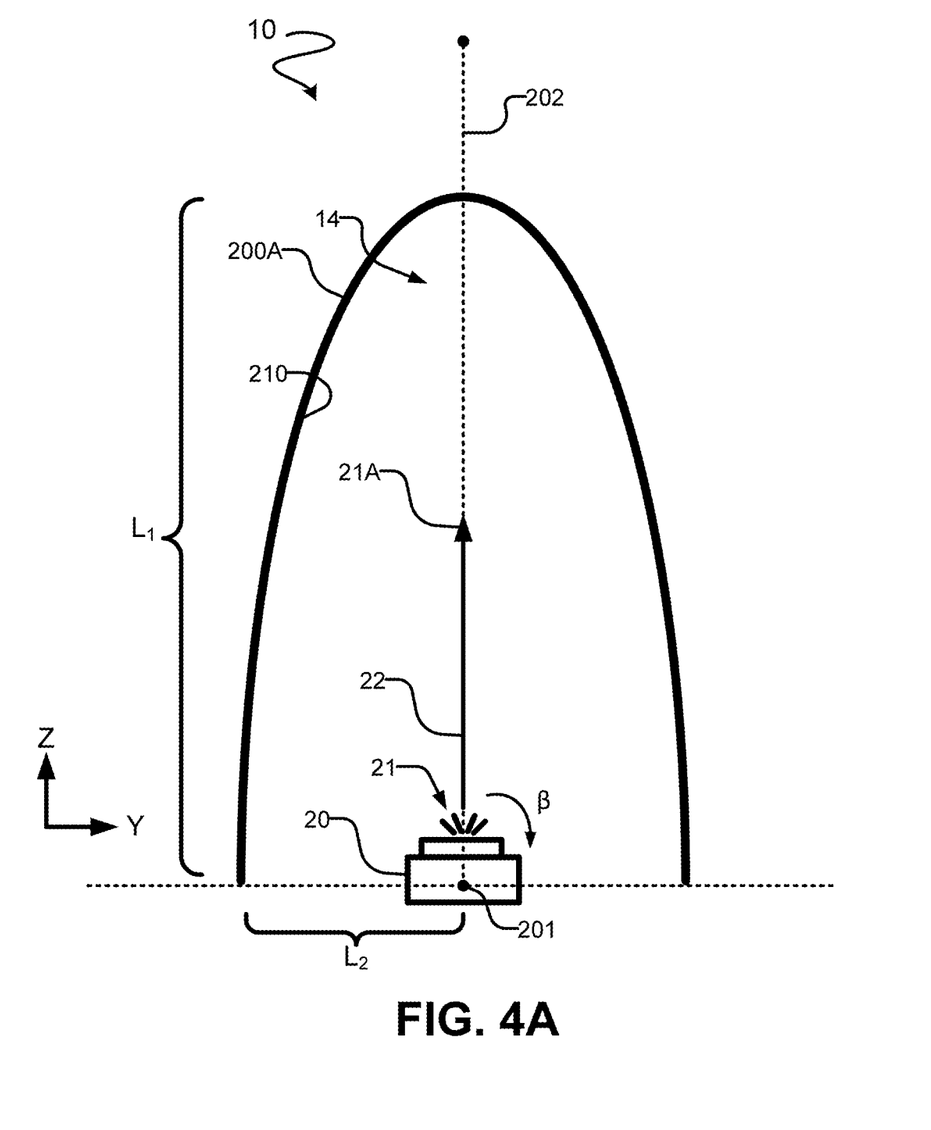
FIG. 4A is a schematic transverse cross section of the reflector shown in FIG. 4.

FIG. 4A is a schematic planar view of a transverse cross section of reflector 200A coupled to UV-LED 20, where a plane of the transverse cross-section has a normal that is parallel with principal reflector axis 201. UV-LED 20 is located adjacent to reflector 200A on (or close to, as defined for other embodiments herein) principal reflector axis 201. For any given cross-section, $L_1$ represents a distance between principal reflector axis 201 and reflective surface 210 of reflector 200A where the distance $L_1$ is oriented in a direction that is parallel with principal optical axis 22 of UV-LED 20.

For a given transverse cross-section, the distance $L_1$ may represent a maximum distance between principal reflector axis 201 and reflective surface 210 of reflector 200A in some embodiments. $L_2$, which may be oriented in a direction that is orthogonal to both principal optical axis 22 and principal reflector axis 201, may represent a minimum distance between principal reflector axis 201 and reflective surface 210 of reflector 200A in some embodiments. $L_1$ and $L_2$ respectively measure 8 mm and 6 mm in the example embodiment shown in FIG. 4A.

UV-LED 20 may be oriented so that its principal optical axis 22 lies in plane of symmetry 202. Principal optical axis 22 (and/or plane of symmetry 202) and the y-axis shown in the FIG. 4A view (which is oriented along the direction of $L_2$) intersect to form an azimuthal angle β. Azimuthal angle β may span an angular range between 60°-180°. In some embodiments, this azimuthal angle β may span a range between 60°-150°. In some embodiments, this azimuthal angle β may span a range between 60°-135°. In some embodiments, this azimuthal angle β may span a range between 60°-100°, in some embodiments. Principal optical axis 22 (and/or plane of symmetry 2020) is perpendicular to the y-axis (i.e. β=90°) in the example embodiment shown in FIG. 4A.

The example arrangement shown in FIGS. 4 and 4A may assist in normalizing the flux across the full output area bounded by endpoints 52E of reflector 200A. A more uniform optical flux advantageously allows assembly 10 to deliver more uniform doses of UV radiation to disinfection target 12.

In some embodiments, as shown for example in FIGS. 4 and 4A, the reflector comprises a relatively narrow opening 14 in the Y-Z plane for high angle rays (i.e. rays oriented an angle greater than 30° from principal optical axis 22) and a relatively wide opening 14 in the Y-Z plane for central rays (i.e. rays within an angle of 30° from principal optical axis 22). However, this is not mandatory.

Reflector 200 may be suitably designed in other embodiments to provide other UV radiation profiles across the output area bounded by endpoints 52 of reflector 200. Reflector 200 may be designed based on factors including, but not limited to: the orientation of UV-LED 20 (i.e. polar angle α, azimuthal angle β), the location of UV-LED 20 relative to principal reflector axis 201, and the radiation profile of UV-LED 20 across various emission angles φ.

In some embodiments, reflector 200 is designed to help assembly 10 provide more concentrated collimated radiation patterns (e.g. where UV-LED 20 is located at the focal point of a paraboloid-shaped reflector).

In some embodiments, two or more light emitting assemblies 10 may be combined to provide suitable UV radiation patterns.

Combining Multiple Light Emitting Assemblies

Figure 5A:
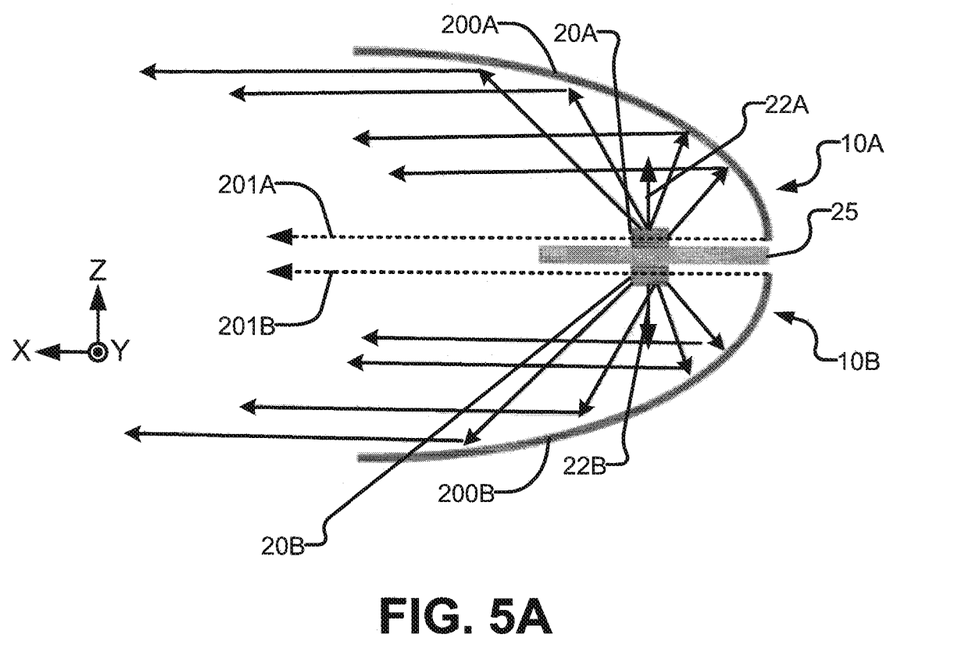
FIG. 5A is a schematic diagram depicting one way of combining multiple light emitting assemblies according to an example embodiment of the invention.

FIG. 5A is a schematic diagram depicting example ways of combining multiple light emitting assemblies 10 according to a particular example embodiment. Assemblies 10A and 10B may be positioned "back-to-back" to cover angular ranges exceeding Θ=180°. For example, a first reflector 200A of a first assembly 10A may span an angular range $Θ_A$ of up to 180° about its principal reflector axis 201A, while a second reflector 200B of a second assembly 10B may span an angular range $Θ_B$ which may be up to 180° about its principal reflector axis 201B.

In the FIG. 5A example embodiment, each light assembly 10 comprises a UV-LED 20 coupled to a corresponding reflector 200A, 200B. Reflectors 200A, 200B may be identical and oriented so that they are mirror symmetric with each other about an x-y plane located between their respective principal reflector axes 201. In some embodiments, assemblies 10A and 10B may comprise reflectors 200A, 200B that have different three-dimensional shapes.

In the FIG. 5A example embodiment, UV-LED 20A of assembly 10A and UV-LED 20B of assembly 10B are oriented so that their principal optical axes 22A and 22B are aligned with each other (e.g. are co-linear) but face opposite directions. This may advantageously provide a radiation profile that is mirror symmetric about an x-y plane located between principal reflector axes 201.

Other possible design variations for combining assemblies 10 include, but are not limited to: combining multiple (i.e. more than two) assemblies 10, orienting UV-LEDs 20 at different polar angle α and/or azimuthal angles 13 for different assemblies 10, orientating reflectors at different reflector polar and/or azimuthal angles for different assemblies 10, and combining assemblies 10 having reflectors that span different ranges of reflector angles.

Supplementary UV Sensor

Figure 6:
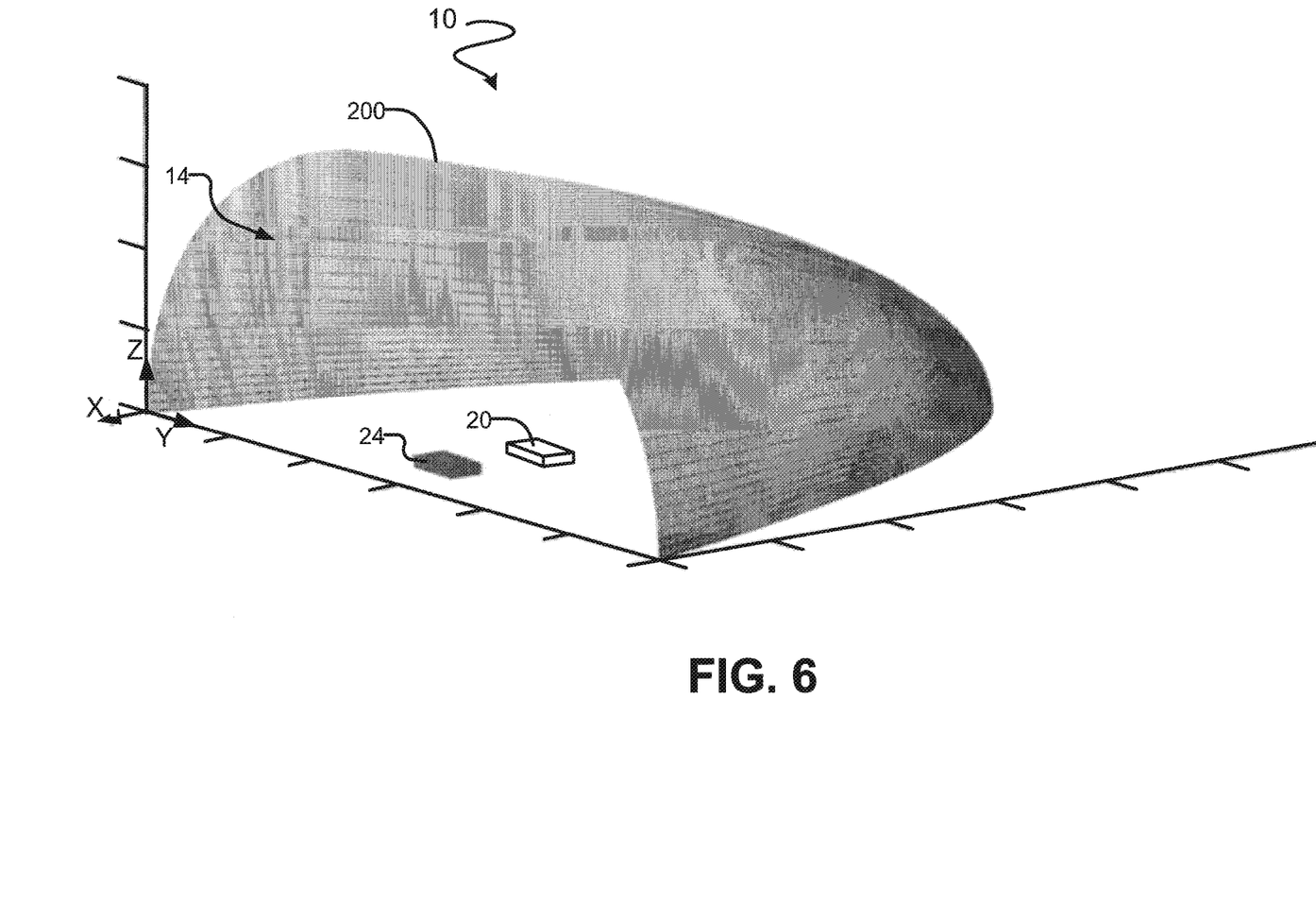
FIG. 6 is a schematic perspective view of a light emitting assembly comprising a UV sensor according to an example embodiment of the invention.

FIG. 6 is a schematic perspective view of a light emitting assembly 10 comprising a UV sensor 24 according to an example embodiment. Like UV-LED 20, UV sensor 24 is located adjacent to reflector 200. UV sensor 24 detects UV light 21 emitted by UV-LED 20 to actively monitor the condition of UV-LED 20. UV sensor 24 may detect stray diffuse reflections and observe back reflections in some embodiments.

UV sensor 24 may be located nearer to opening 14 (in the Y-Z plane) relative to UV-LED 20 in some embodiments, although this is not necessary. Locating UV sensor 24 near opening 14 advantageously allows UV sensor 24 to capture sufficient diffuse reflection from UV-LED 20 to measure the power of assembly 10 more accurately. Alternate embodiments can locate the UV sensor 24 in a more recessed position relative to UV-LED 20. UV sensor 24 may comprise or may be connected to a suitable control circuit or logic circuit, which may optionally transmit a warning signal to a user and/or external computing device if it detects insufficient power delivered by UV-LED 20.

In some embodiments, UV sensor 24 is fabricated on the same printed circuit board assembly (PCBA) as UV-LED 20. This can advantageously simplify manufacturing and minimize costs.

Some embodiments provide supplementary systems and apparatus for managing the thermal dissipation of UV-LED 20. For example, UV-LED 20 may be fabricated and/or mounted on a thermally conductive PCBA substrate in thermo-mechanical contact with a heat sink. Reflectors 100, 200 may act as heat sink in some embodiments. For these embodiments, reflectors 100, 200 are constructed from materials that are both thermally conductive and optically reflective. Suitable materials include aluminum and/or other predominantly specularly reflective materials.

Aspects of the present invention includes a variety of possible supplementary designs to light emitting assembly 10 and/or other aspects of light emitting assembly 10. These variations may be applied to all of the embodiments described above, as suited, and include, without limitation the following:

reflector 100 may be interchanged with reflector 200; and
UV sensor 24 can be incorporated into any suitable assembly 10.

The emitters described herein advantageously provide design flexibility with respect to controlling the directionality of the majority of emitted rays. Such flexibility is advantageous in a number of non-limiting example applications. On such example application relates to surface disinfection applications, where there is a desire to illuminate a specific surface region. There may be a similar desire to avoid illuminating one or more other regions, such as for safety or material incompatibility reasons, for example. Controlling the direction of emitted rays allows the designer flexibility to achieve selective surface illumination applications.

A second example application for the emitters described herein relates to flowing water disinfection generally, where the emitter is part of a disinfection apparatus and is used in conjunction with a vessel or conduit through which water flows, typically with an optical window separating the optical emitter from the vessel/conduit through which water flows. Flexibility to control the directionality of the rays from the emitter allows the designer to selectively localize the distribution of irradiance into the flowing water to optimize the outcome disinfection provided by the disinfection apparatus. A third non-limiting application is a more specific embodiment of the second example. In some flowing water disinfection apparatus, there may be a desire that the path of the light rays is near parallel to the average flow direction of the flowing water. Having flexible control of the directionality of the light rays may permit the achievement this desire. By way of non-limiting example, reflective surfaces with paraboloid like shapes allow near collimation of the majority of light rays which in turn allows alignment with the average flow direction of the flowing water.

Another non-limiting example application which may take advantage of the flexibility of controlling the directionality of light rays using the emitters described herein relates to tank-top applications for standing water vessel. In such example applications, the flexibility to control of the directionality of the rays from the emitters allows the rays to be distributed preferentially into corners or otherwise dark areas of the standing water vessel to maximize disinfection efficiency.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. An ultraviolet (UV) radiation emitting assembly comprising:
one or more UV-LED(s) having a principal optical axis that is central to the direction of radiation emission from the one or more UV-LED(s); and
a reflector located adjacent to the UV-LED(s) and having a three-dimensional shape defined by rotating a smooth and continuous curve having two end points about a principal reflector axis over a reflector angle θ, where the reflector angle θ is in a range of 120°-300°, the principal reflector axis intersecting the curve at one of the two end points and at no other points on the curve;
wherein the principal optical axis of the UV-LED(s) is directed toward the reflector.

2. A UV radiation emitting assembly according to claim 1 wherein the curve is a portion of a parabola.

3. A UV radiation emitting assembly according to claim 1 wherein the curve is a portion of an ellipse.

4. A UV radiation emitting assembly according to claim 1 wherein the curve is a portion of a circular arc.

5. A UV radiation emitting assembly according to claim 1 wherein the curve is a straight line.

6. A UV radiation emitting assembly according to claim 1 wherein the curve comprises a first portion that is a portion of a parabola and a second portion that is a portion of an ellipse.

7. A UV radiation emitting assembly according to claim 1 wherein the reflector comprises material suitable for predominantly specular reflection of UV light (e.g. light having wavelengths in a range of 250-300 nm).

8. A UV radiation emitting assembly according to claim 1 wherein the principal optical axis of each UV-LED forms an angle α with the principal reflector axis, the angle α in a range of 45°-135°.

9. A UV radiation emitting assembly according to claim 1 wherein the principal optical axis of each UV-LED forms an angle α with the principal reflector axis, the angle α in a range of 85°-95°.

10. A UV radiation emitting assembly according to claim 1 wherein the one or more UV-LED(s) comprise a plurality of UV-LEDs arranged symmetrically about a focal point of the reflector.

11. A UV radiation emitting assembly according to claim 10 wherein the plurality of UV-LEDs is located on the principal reflector axis.

12. A UV radiation emitting assembly according to claim 1 wherein the one or more UV-LED(s) comprise one UV-LED located on the principal reflector axis at a focal point of the reflector.

13. A UV radiation emitting assembly according to claim 1 wherein each UV-LED is located within a circle centered at the principal reflector axis and having a radius of ⅕ of a distance between the reflector and the principal reflector axis measured at an axial location of the UV-LED.

14. A UV radiation emitting assembly according to claim 1 wherein each UV-LED is located within a distance of 5 times a dimension of the UV-LED of the focal point of the reflector.

15. A UV radiation emitting assembly according to claim 1 wherein the three-dimensional shape is shaped to capture radiation emitted from the one or more UV-LED(s) from at least 67% of an effective emission angle $\phi$ over which the UV-LED(s) emits radiation.

16. A UV radiation emitting assembly according to claim 1 wherein the three-dimensional shape is shaped to capture radiation emitted from the one or more UV-LED(s) over a emission angle $\phi$ greater than $\phi=50°$.

17. A UV radiation emitting assembly according to claim 1 comprising an optical sensor located adjacent to the reflector for measuring radiation emitted by the radiation emitting assembly.

18. A UV radiation emitting assembly according to claim 1 wherein the reflector is fabricated at least partially by a thermally conductive material and is shaped for dissipating heat generated by the UV-LED(s).

19. Use of the UV radiation assembly of claim 1 for a flowing water disinfection application wherein the reflector is shaped to collimate radiation emitted from the UV-LED(s) such that the collimated direction is generally parallel, within a solid angle of 15°, with an average flow direction of the water in the flowing water disinfection application.

20. An ultraviolet (UV) radiation emitting assembly comprising:
- one or more UV-LED(s) having a principal optical axis that is central to the direction of radiation emission from the one or more UV-LED(s); and
- a reflector located adjacent to the UV-LED(s) and having a three-dimensional shape defined by rotating a smooth and continuous curve having two end points about a principal reflector axis over a reflector angle $\theta$, where the reflector angle $\theta$ is less than 360°, the principal reflector axis intersecting the curve at one of the two end points and at no other points on the curve;
- wherein the principal optical axis of the UV-LED(s) is directed toward the reflector; and
- wherein the three-dimensional shape is shaped to capture radiation emitted from the one or more UV-LED(s) from at least 67% of an effective emission angle $\phi$ over which the UV-LED(s) emits radiation.

* * * * *